United States Patent [19]

Miller et al.

[11] Patent Number: 5,289,090
[45] Date of Patent: Feb. 22, 1994

[54] AUTOMATIC CAMCORDER PANNING DEVICE

[76] Inventors: Jeffrey E. Miller, 1202 Duesenberg Rd., Auburn, Ind. 46706; J. Michael Lewis, 0811 C.R. 28, Corunna, Ind. 46730

[21] Appl. No.: 844,519

[22] Filed: Mar. 2, 1992

Related U.S. Application Data

[63] Continuation-in-part of Ser. No. 698,161, May 9, 1991, abandoned.

[51] Int. Cl.⁵ .................. H02P 1/22; G03B 29/00
[52] U.S. Cl. ..................... 318/282; 318/286; 248/349; 354/293; 348/143; 348/373
[58] Field of Search ............... 318/280, 281, 282, 283, 318/285, 286, 256, 257; 248/183, 346, 349; 352/242, 243; 354/80, 81, 82, 293; 358/108, 199, 229

[56] References Cited

U.S. PATENT DOCUMENTS

| | | | |
|---|---|---|---|
| 2,957,365 | 10/1960 | Sachtler . | |
| 3,164,838 | 1/1965 | Heinrich . | |
| 3,399,614 | 9/1968 | Fischer . | |
| 3,437,753 | 4/1969 | Stith . | |
| 3,457,367 | 7/1969 | Tyler . | |
| 3,635,140 | 1/1972 | Wolf . | |
| 3,638,502 | 2/1972 | Leavitt et al. . | |
| 3,640,199 | 2/1972 | Wolf . | |
| 4,080,629 | 3/1978 | Hammond et al. . | |
| 4,158,488 | 6/1979 | Gottschalk et al. . | |
| 4,222,540 | 9/1980 | King et al. . | |
| 4,225,881 | 9/1980 | Tovi | 358/108 |
| 4,577,827 | 3/1986 | Eliscu . | |
| 4,593,982 | 6/1986 | Rosset | 354/99 |
| 4,620,285 | 10/1986 | Perdue | 364/513 |
| 4,655,567 | 4/1987 | Morley . | |
| 4,673,268 | 6/1987 | Wheeler et al. . | |
| 4,673,278 | 6/1987 | Fukuda et al. . | |
| 4,709,265 | 11/1987 | Silverman et al. | 358/108 |
| 4,720,805 | 1/1988 | Vye . | |
| 4,728,839 | 3/1988 | Coughlan et al. . | |
| 4,736,218 | 4/1988 | Kutman . | |
| 4,847,543 | 7/1989 | Fellinger . | |
| 4,866,355 | 9/1989 | The | 318/282 |
| 4,890,713 | 1/1990 | Pagano . | |
| 4,918,473 | 4/1990 | Blackshear | 354/81 |
| 4,922,275 | 5/1990 | Hughes . | |
| 4,924,718 | 5/1990 | Glover . | |
| 4,945,367 | 7/1990 | Blackshear . | |
| 4,974,088 | 11/1990 | Sasaki | 358/210 |
| 4,980,871 | 12/1990 | Sieber et al. . | |
| 5,159,368 | 10/1992 | Zemlin | 354/81 |

*Primary Examiner*—Bentsu Ro
*Attorney, Agent, or Firm*—MacMillan, Sobanski & Todd

[57] ABSTRACT

An automatic panning device adapted for use with camcorders and similar equipment includes a bi-directional electric motor which is connected to rotate a mounting plate upon which the camcorder is secured. A control circuit controls the direction and speed of rotation of the mounting plate so as to pan the camcorder back and forth throughout a predetermined angular displacement. In a first embodiment, the amount of such angular displacement is controlled by a pair of limit arms which are pivotably secured to the mounting plate. A proximity sensor is provided for sensing panning movement of the limit arms with the mounting plate to a predetermined location. When this occurs, the proximity sensor generates a signal to the control circuit to reverse the direction of rotation. In a second embodiment, the proximity sensor is provided on the mounting plate and is moved relative to a pair of limit targets slidably mounted on a housing for the device. In a third embodiment, the amount of such angular displacement is controlled by an electronic rotational limit circuit connected to the control circuit. In a fourth embodiment, the amount of such angular displacement is controlled by an electronic rotational time circuit connected to the control circuit.

22 Claims, 5 Drawing Sheets

5,289,090

AUTOMATIC CAMCORDER PANNING DEVICE

CROSS REFERENCE TO RELATED APPLICATION

This application is a continuation-in-part of Ser. No. 07/698,161, filed May 9, 1991, now abandoned.

BACKGROUND OF THE INVENTION

This invention relates in general to devices for effecting panning movement and in particular to an automatic panning device having easily adjustable limits for use with camcorders and similar video equipment.

Portable video cameras and recorders, commonly referred to as camcorders, are well known articles which are in widespread use today. Such camcorders are typically of the hand-held type, wherein an operator simultaneously supports and operates the camcorder so as to record an event as it occurs. To accomplish this, the operator points the camcorder in various directions, typically zooming-in and zooming-out to capture the event from many different angles and perspectives. While this is an effective way to record an event, it has the drawback of not permitting the operator to participate directly in the event being recorded.

To alleviate this problem, it is known to support the camcorder on a tripod or similar structure so as to be pointed toward a desired location to record the event. This solution has the advantage of permitting the operator to directly participate in the event. Unfortunately, when the camcorder is supported in this fashion, there is no movement of the camcorder as the event is being recorded. Because of this lack of camcorder movement, there is no change in the frame of the picture being recorded. As a result, the recorded event becomes difficult or boring to view after a very short period of time. Furthermore, in some instances, the event being recorded occupies a wide physical area. Thus, to record the entire event while positioned on a stationary tripod, the camcorder must be located a rather long distance away from the event so as to fit the entire event within the frame of the picture being recorded. This also results in a recording which is somewhat undesirable to view.

Some devices are known for automatically panning a camcorder back and forth so as to provide camera movement and to allow the camcorder to be moved closer to the scene being recorded. Unfortunately, known panning devices are rather expensive and, therefore, are often not purchased by average users. Furthermore, known panning devices are usually complicated and difficult to set up and use. Accordingly, it would be desirable to provide an improved automatic camcorder panning device which is simple and inexpensive in construction and operation.

SUMMARY OF THE INVENTION

This invention relates to an automatic panning device adapted for use with camcorders and similar equipment. The device includes a bi-directional electric motor which is connected to rotate a mounting plate upon which the camcorder is secured. A control circuit controls the direction and speed of rotation of the mounting plate so as to pan the camcorder back and forth throughout a predetermined angular displacement. In a first embodiment of this invention, the amount of such angular displacement is controlled by a pair of limit arms which are pivotably secured to the mounting plate. A proximity sensor is provided for sensing panning movement of the limit arms with the mounting plate to a predetermined location. When this occurs, the proximity sensor generates a signal to the control circuit to reverse the direction of rotation. In a second embodiment of this invention, the proximity sensor is provided on the mounting plate and is moved relative to a pair of limit targets slidably mounted on a housing for the device. In a third embodiment of this invention, the amount of such angular displacement is controlled by an electronic rotational limit circuit connected to the control circuit. In a fourth embodiment of this invention, the amount of such angular displacement is controlled by an electronic rotational time circuit connected to the control circuit.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
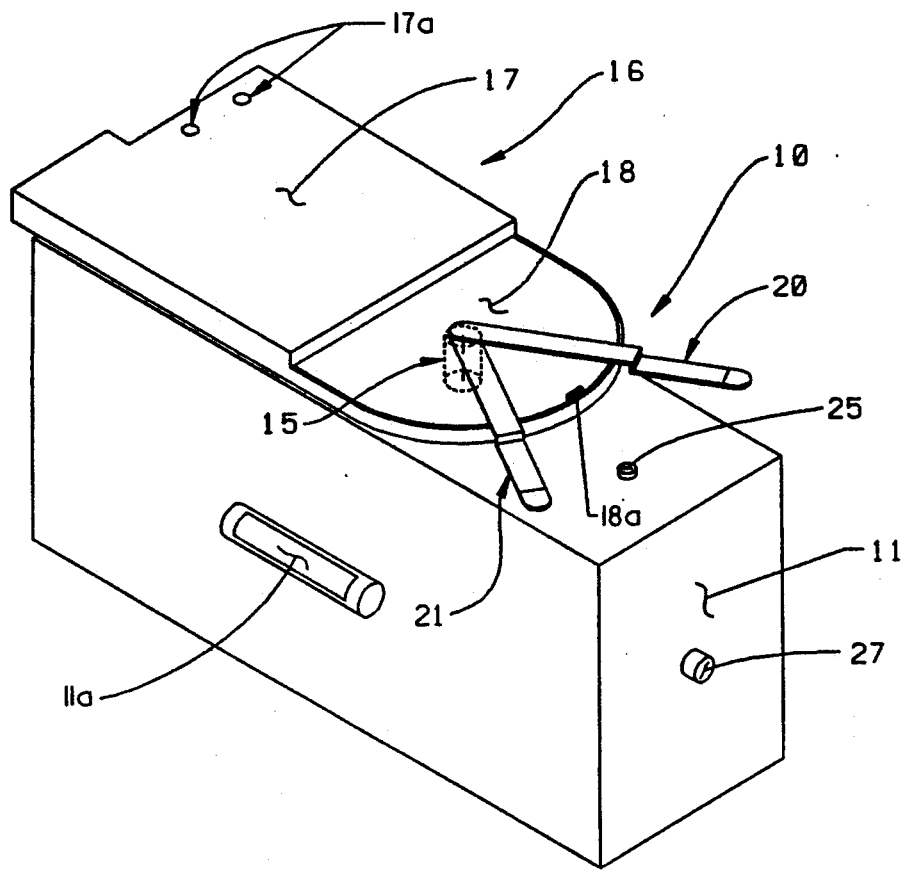
FIG. 1 is a perspective view of a first embodiment of an automatic camcorder panning device in accordance with this invention.
Figure 2:
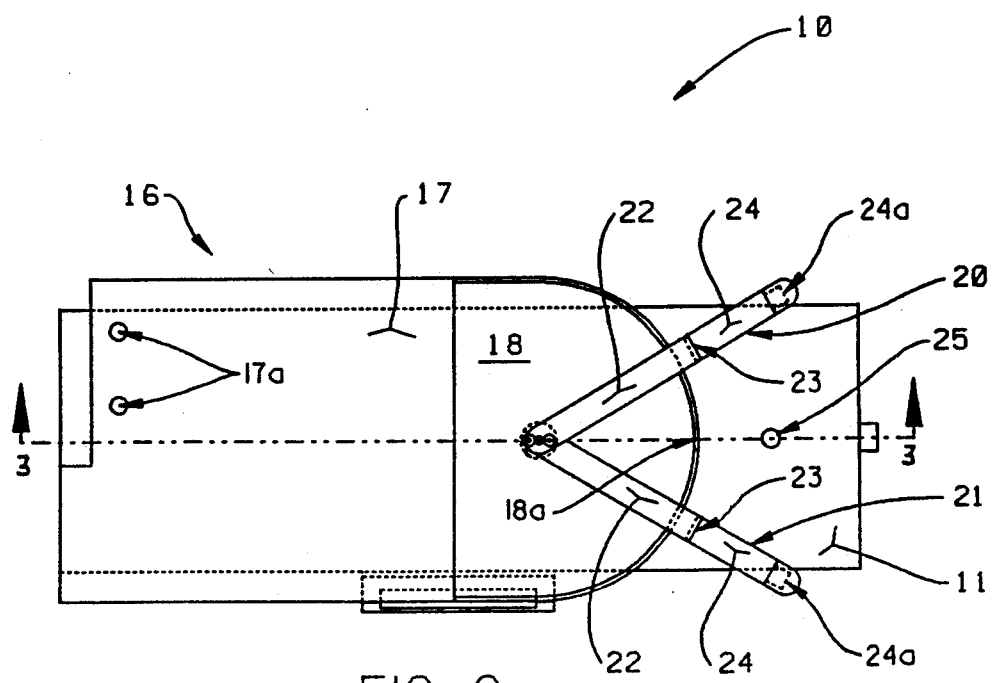
FIG. 2 is a top plan view of the automatic camcorder panning device illustrated in FIG. 1.
Figure 3:
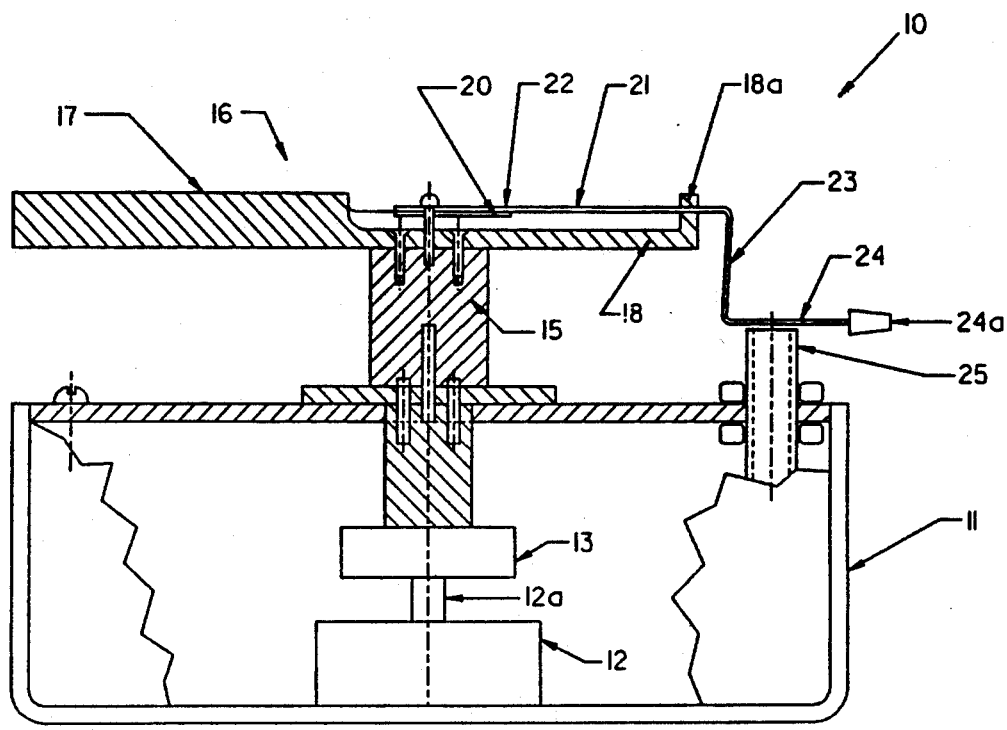
FIG. 3 is a sectional elevational view, partially broken away, taken along line 3—3 of FIG. 2.

Referring now to the drawings, there is illustrated in FIGS. 1 through 3 a first embodiment of an automatic camcorder panning device, indicated generally at 10, in accordance with this invention. The device 10 includes a housing 11 having a lower surface which is adapted to be mounted on a conventional tripod (not shown) or similar support surface. A level indicating means 11a is secured to one side of the housing 11 to provide an indication of the relative inclination of the device 10 on the tripod.

A bi-directional electric motor 12 is contained with the housing 11. The motor 12 includes an upwardly extending rotatable output shaft 12a which is connected through a gearbox 13 to a rotatable drive shaft 15. The drive shaft 15 extends upwardly through an aperture formed in the upper surface of the housing 11. A mounting plate, indicated generally at 16, is secured to the drive shaft 15 for rotation therewith. The mounting plate 16 is disposed above the housing 11 and is adapted to have a camcorder (not shown) or similar article secured thereto. Thus, when the motor 12 is actuated to rotate the output shaft 12a in either a first or second rotational direction, the drive shaft 15, the mounting plate 16, and the camcorder secured to the mounting plate 16 all rotate therewith. The means for controlling the operation of the motor 12 will be explained in detail below.

The mounting plate 16 is formed having a first end 17 and a second end 18. The first end 17 is generally flat and rectangular in shape, having a predetermined thickness. One or more apertures 17a may be formed through the first end 17 of the mounting plate 16 to permit the camcorder to be secured thereto. The second end 18 of the mounting plate 16 is generally flat and semi-circular in shape, having a predetermined thickness which is less than the thickness of the first end 17. Thus, a semi-circular recessed area is defined in the upper surface of the second end 18. An upwardly extending stop 18a is formed at the center of the semi-circular perimeter of the second end 18. The function of this stop 18a will be explained below.

A pair of limit arms, indicated generally at 20 and 21, are secured to the second end 18 of the mounting plate 16. The two limit arms 20 and 21 are essentially identical in shape, each including first, second, and third linear portions 22, 23, and 24, respectively. As best shown in FIG. 3, the inner ends of the first portions 22 are secured to the mounting plate 16 for pivoting movement about the axis of rotation defined by the drive shaft 15. The first portions 22 extend horizontally over the second end 18 of the mounting plate 16 on either side of the stop 18a. The second ends 23 extend vertically downwardly from the outer end of the first portions 22. The third portions 24 extend horizontally from the lower ends of the second portions 23 over the upper surface of the housing 11. Handles 24a may be secured to the outer ends of the third portions 24 to facilitate the grasping thereof by an operator of the device 10. For reasons which will be explained below, it is preferable that the limit arms 20 and 21 or the handles 24a be formed from a metallic material.

A proximity sensor 25 is mounted in the upper surface of the housing 11. The proximity sensor 25 is preferably located along a line which extends from the rotational axis of the drive shaft 15 to the center of the semi-circular perimeter of the second end 18. Furthermore, the proximity sensor 25 is preferably spaced no further from the rotational axis of the drive shaft 15 than the handles 24a of the limit arms 20 and 21. If the limit arms 20 and 21 or the handles 24a are formed from a metallic material, the proximity sensor 25 may be embodied as any one of a number of conventional sensors which are adapted to generate an electrical signal when a metallic object is passed thereby.

As discussed above, the limit arms 20 and 21 are secured to the second end 18 of the mounting plate 16 pivoting movement about the axis of rotation defined by the drive shaft 15. The limit arms 20 and 21 can be pivoted about such axis relative to the mounting plate 16 by manually grasping and moving the handle portions 24a. Once they are positioned relative to the mounting plate 16 by such manual manipulation, the limit arms 20 and 21 will rotate with the mounting plate 16 when the motor 12 is actuated. Thus, when the motor 12 is energized to rotate the mounting plate 16, the limit arms 20 and 21 rotate therewith. The stop 18a prevents the limit arms 20 and 21 from being positioned too closely together or from being positioned on the same half of the semi-circular perimeter of the second end 18.

Figure 4:
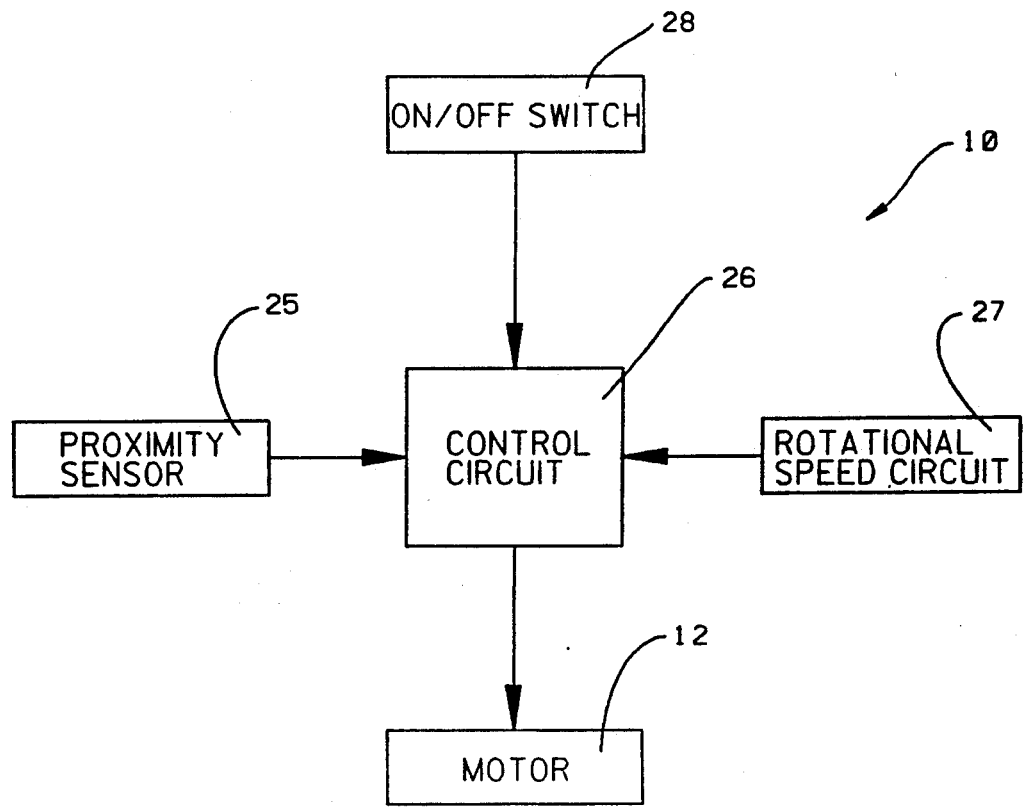
FIG. 4 is a block diagram of the internal components of the automatic camcorder panning device illustrated in FIGS. 1 through 3.

Referring now to FIG. 4, an electronic control circuit 26 is provided for controlling the operation of the motor 12, namely, the direction and speed of rotation of the output shaft 12a. The proximity sensor 25 is connected to the electronic control circuit 26, as are a rotational speed circuit 27 and an on/off switch 28. The rotational speed circuit 27 is conventional in the art and is adapted to generate an electrical signal which is representative of the desired speed at which the drive shaft 15, the mounting plate 16, and the camcorder is to be rotated about the axis defined by the drive shaft 15. The rotational speed circuit 27 is preferably embodied as a potentiometer, although a digital encoder may be used. The on/off switch 28 is also conventional in the art and is adapted to generate an electrical signal when it is desired to operate the device 10. The on/off switch 28 may be embodied as a single pole, single throw switch.

The control circuit 26 is responsive to the signals generated by the proximity sensor 25, the rotational speed circuit 27, and the on/off switch 28 for controlling the operation of the motor 12. The control circuit 26 may be formed from conventional logic and discrete circuit components. As will be explained below, the control circuit 26 is responsive to the signal generated by the proximity switch 25 for changing the direction of rotation of the output shaft 12a of the motor 12, while the speed of such rotation (in both rotational directions) is controlled in response to the condition of the rotational speed circuit 27. The control circuit 26 is responsive to the condition of the on/off switch 28 for energizing and de-energizing the motor 12. Thus, the motor 12 is energized only when the on/off switch 28 is turned on by an operator of the device 10.

When the on/off switch 28 is turned on, the control circuit 26 controls the rotational speed of the output shaft 12a of the motor 12 in accordance with the condition of the rotational speed circuit 27. The initial direction of such rotation may be pre-programmed into the control circuit 26 so as to always be the same. Alternatively, the control circuit 26 may simply begin rotating the output shaft 12a in the same direction as it was when the device 10 was previously turned off. In any event, the rotational speed of the output shaft 12a (as reduced through the gearbox 13) determines the speed at which the drive shaft 15, the mounting plate 16, and the camcorder is rotated.

As the mounting plate 16 is rotated, the limit arms 20 and 21 rotate therewith. Such rotation continues until one of the limit arms 20 or 21 or its associated handle 24a is moved over the proximity sensor 25. When that occurs, the proximity sensor 25 generates a signal to the control circuit 26. In response thereto, the control circuit reverses the direction of rotation of the motor 12. Therefore, the drive shaft 15, the mounting plate 16, and the camcorder are all rotated in the opposite direction. Such rotation continues until the other of the limit arms 20 or 21 or its associated handle 24a is moved over the proximity sensor 25. When that occurs, the proximity sensor 25 again generates a signal to the control circuit 26, which again reverses the direction of rotation of the motor 12.

Thus, it can be seen that the relative positions of the two limit arms 20 and 21 define the angular limits of rotation for the mounting plate 16 and, therefore, the camcorder. Such limits can be set quickly and easily by simply grasping and moving the limit arms 20 and 21 to any desired rotational position relative to the mounting plate 16. Once moved in this manner, friction will maintain the limit arms in the desired positions. The control circuit 26 will continue to pan the mounting plate 16 back and forth in accordance with the limits determined by the limit arms 20 and 21 until the on/off switch 28 is turned off.

If desired, the control circuit 26 may be programmed to turn the motor 12 off for a predetermined time period when the signal is generated by the proximity sensor 25. Thus, instead of immediately changing the direction of rotation, the control circuit 26 would hold the mounting plate 16 and the camcorder at the limit position for a predetermined length of time before beginning rotation in the opposite direction. Alternatively, the time delay may be programmed to occur at one or more points between the limits of rotation. These time delays permit the camcorder to record a portion of the entire event without camera movement, but still permit the camcorder to be automatically moved to a new position after a predetermined time period.

Figure 5:
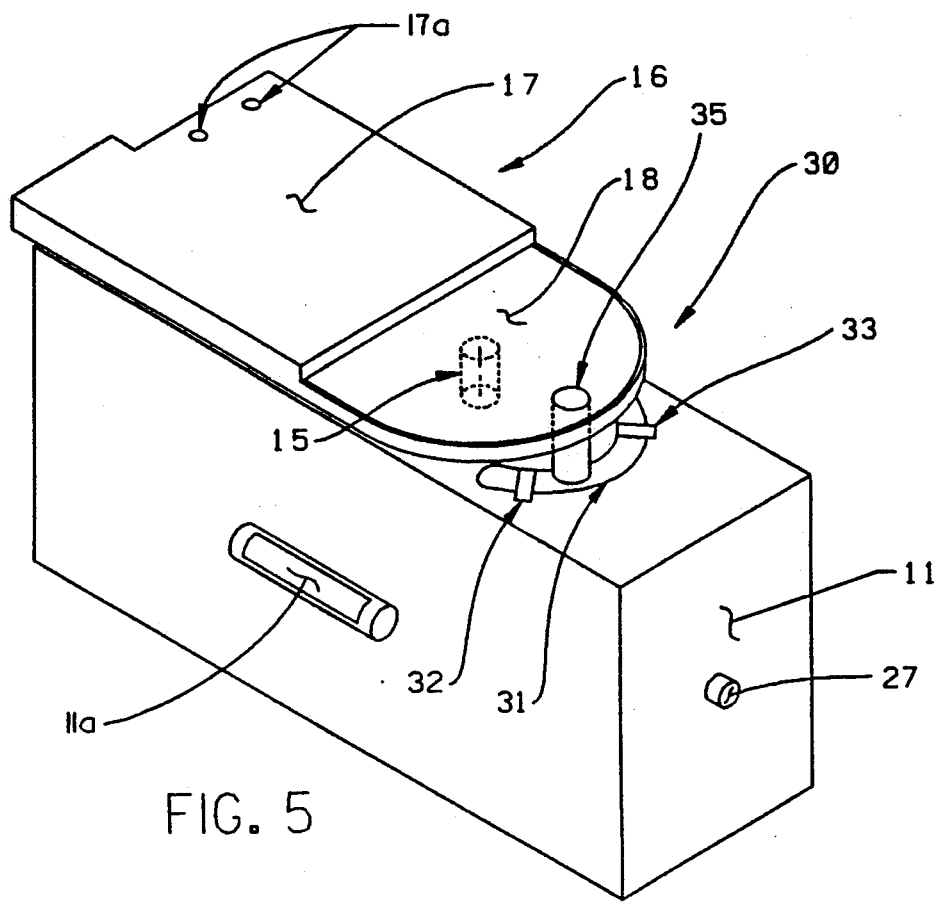
FIG. 5 is a perspective view of a second embodiment of an automatic camcorder panning device in accordance with this invention.
Figure 6:
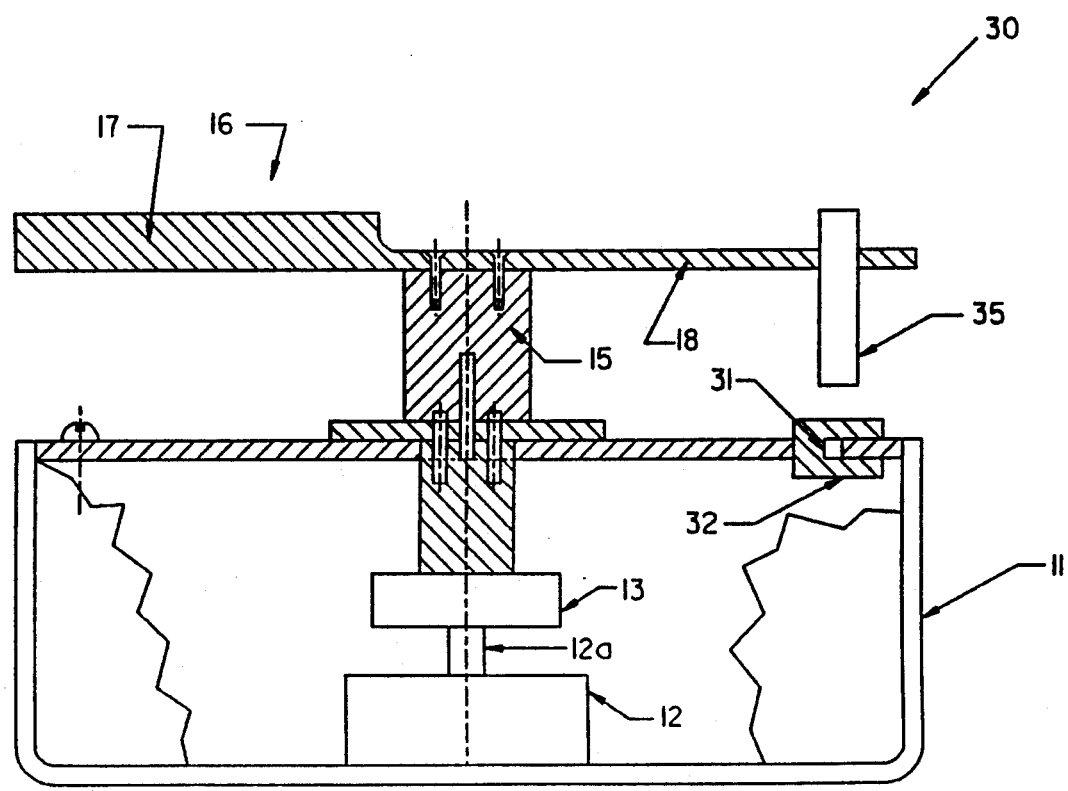
FIG. 6 is a sectional elevational view, partially broken away, of the automatic camcorder panning device illustrated in FIG. 5.

Referring now to FIGS. 5 and 6, there is illustrated a second embodiment of an automatic camcorder panning device, indicated generally at 30, in accordance with this invention. The structure and operation of the second device 30 are generally similar to the first device 10 described above, and like reference numbers are used to indicate identical parts. Instead of providing the pivotable limit arms 20 and 21 on the mounting plate 16, however, an arcuate slot 31 is formed in the upper surface of the housing 11, and a pair of limit targets 32 and 33 are slidably mounted therein. The limit targets 32 and 33 can be formed from any flexible material which resiliently engages the top and bottom of the upper surface of the housing. As a result, the limit targets 32 and 33 are normally maintained in position relative to the housing 11, but can be moved throughout the arcuate slot 31 by applying a light pressure thereto, such as by a finger. A proximity sensor 35 is mounted in the second end 18 of the mounting plate 16.

Similar to the limit arms 20 and 21 discussed above, the limit targets 32 and 33 can be moved throughout the length of the arcuate slot 31 to define the limits of rotation of the mounting plate 16. When the motor 12 is energized to rotate the mounting plate 16 in a first direction, the proximity sensor 35 mounted thereon rotates therewith. The proximity sensor 35 is connected to the electronic control circuit 26 in the same manner as the proximity sensor 25 discussed above. Consequently, when the mounting plate 16 is rotated a sufficient distance that the proximity sensor 35 is moved over one of the limit targets 32 or 33, an electrical signal will be sent to the control circuit 26. In response thereto, the control circuit 26 will reverse the direction of rotation of the motor 12. The operation of the second device 30 is otherwise identical to that of the first device 10.

Figure 7:
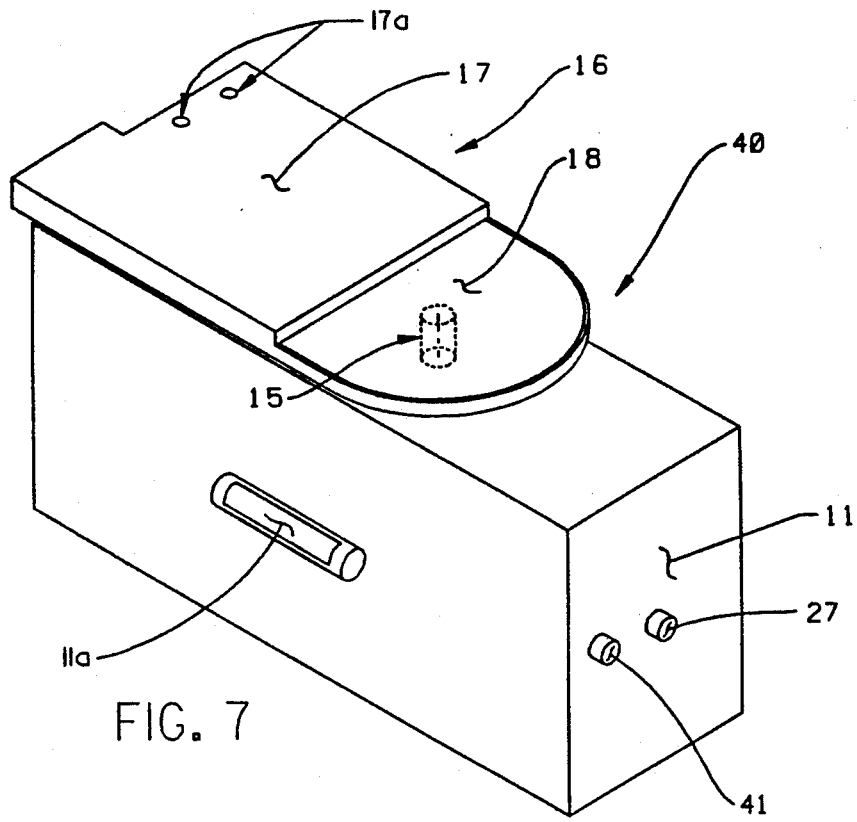
FIG. 7 is a perspective view of a third embodiment of an automatic camcorder panning device in accordance with this invention.
Figure 8:
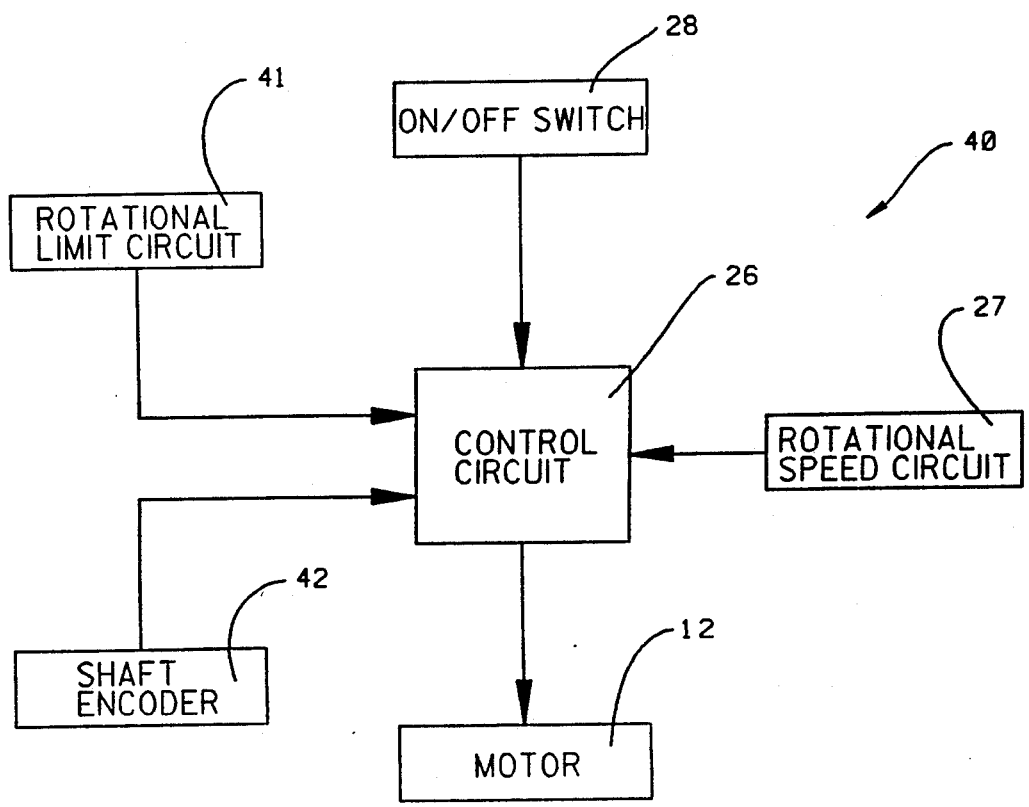
FIG. 8 is a block diagram of the internal components of the automatic camcorder panning device illustrated in FIG. 7.

Referring now to FIGS. 7 and 8, there is illustrated a third embodiment of an automatic camcorder panning device, indicated generally at 40, in accordance with this invention. The structure and operation of the third device 40 are generally similar to the first device 10 described above. However, the limit arms 20 and 21 of the first device 10 are replaced by an electronic rotational limit circuit 41. The rotational limit circuit 41 is conventional in the art and is adapted to generate an electrical signal which is representative of the angular limits at which the drive shaft 15, the mounting plate 16, and the camcorder are to be rotated about the axis defined by the drive shaft 15. The rotational limit circuit 41 is preferably embodied as a digital encoder, although a potentiometer may be used.

The control circuit 26 is responsive to the signal from the rotational limit circuit 41 for controlling the motor 12 to change the direction of rotation when a predetermined amount of such rotation has occurred. To accomplish this, a shaft encoder 42 is also connected to the control circuit 26. The shaft encoder 42 is conventional in the art and is adapted to generate an electrical signal which is representative of the angular position of the drive shaft 15. The control circuit 26 repeatedly compares the signal from the shaft encoder 42 with the signal from the rotational limit circuit 41. When such signals are equal, the control circuit 26 changes the direction of rotation of the motor 12, as described above.

Figure 9:
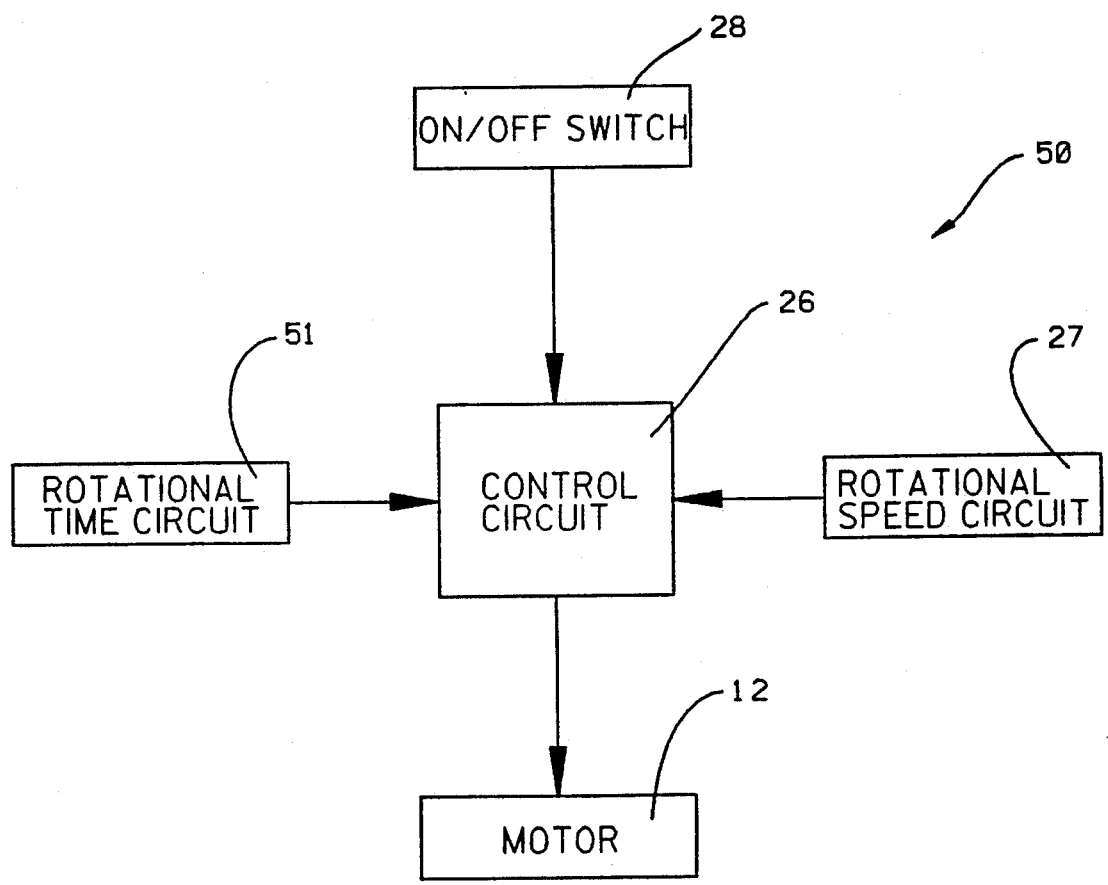
FIG. 9 is a block diagram of the internal components of a fourth embodiment of an automatic camcorder panning device in accordance with this invention.

Referring now to FIG. 9, there is illustrated a fourth embodiment of an automatic camcorder panning device, indicated generally at 50, in accordance with this invention. The structure and operation of the fourth device 50 are generally similar to the third device 40 described above. However, the rotational limit circuit 41 is replaced by a rotational time circuit 51. The rotational time circuit 51 is conventional in the art and is adapted to generate an electrical signal which is representative of the period of time during which the drive shaft 15, the mounting plate 16, and the camcorder are to be rotated in either direction about the axis defined by the drive shaft 15. Thus, the actual amount of rotational movement will be determined by both the time duration of such movement (determined by the rotational time circuit 51) and by the speed of such rotation (determined by the rotational speed circuit 27). The rotational time circuit 51 is preferably embodied as a micro controller, although a voltage controlled oscillator may be used.

The control circuit 26 is responsive to the signal from the rotational time circuit 51 for controlling the motor 12 rotate the drive shaft 15 in a first direction for the predetermined amount of time. After such period of time has expired, the control circuit 26 causes the motor 12 to cease further rotation of the drive shaft 15 in the first direction. Thereafter, the control circuit 26 controls the motor 12 to rotate the drive shaft 15 in a second direction for the same predetermined amount of time. This change in rotational direction may occur immediately, wherein the drive shaft 15 is stationary for little or no period of time.

Alternatively, the control circuit 26 may cause the motor 12 to become inactive for a predetermined period of time, causing the drive shaft 15 to dwell at its end position before being rotated in the opposite direction. The control circuit 26 may also cause the motor 12 to become inactive for a predetermined period of time at some point intermediate the limits of rotation of the drive shaft 15. For example, the control circuit 26 may cause the drive shaft 15 to briefly pause at the central position between the two ends before continuing rotation in the same direction.

Accordingly, it can be seen that this invention provides a simple and inexpensive apparatus for controlling the operation of the motor 12 and, therefore, the panning movement of the camcorder secured to the mounting plate 16. In the first embodiment, the limits of such panning movement are adjusted by manually pivoting the limit arms 20 and 21 relative to the mounting plate 16. In the second embodiment, the limits of such panning movement are adjusted by manually moving the limit targets 32 and 33 relative to the housing 11. In the third embodiment, the limits of such panning are adjusted by manually operating the rotational limit circuit 41. In the fourth embodiment, the limits of such panning are adjusted by manually operating the rotational time circuit 51. In all of the embodiments, the event recorded by the camcorder is improved, and the operator is able to participate in the event. It will also be appreciated that the device of this invention may be used in connection with articles other than camcorders to effect panning movement thereof.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A device for effecting panning movement of an article in two rotational directions within a predetermined limit of rotation comprising:
   a mounting plate adapted to be secured to the article, said mounting plate defining a plane;
   motor means for rotating said mounting plate in either of two rotational directions;
   a limit arm mounted on said mounting plate for rotation therewith, said limit arm being movable throughout a plane which is parallel to said plane defined by said mounting plate relative to said mounting plate to selectively define the predetermined limit of rotation; and
   control circuit means responsive to the position of said limit arm for controlling the operation of said motor means to change the direction of rotation at the predetermined limit of rotation to effect panning movement thereof.

2. The invention defined in claim 1 wherein said limit arm is pivotably connected to said mounting plate to define the predetermined limit of rotation.

3. The invention defined in claim 1 wherein said control circuit means includes sensor means for generating a signal when said limit arm is rotated with said mounting plate to the predetermined limit of rotation, said control circuit means being responsive to the generation of said signal for controlling the operation of said motor means to change the direction of rotation of said mounting plate.

4. The invention defined in claim 1 wherein two of said limit arms are mounted on said mounting plate for rotation therewith, each of said limit arms being movable relative to said mounting plate to selectively and independently define individual predetermined limits of rotation.

5. The invention defined in claim 4 wherein said control circuit means is responsive to the position of each of said limit arms for controlling the operation of said motor means to change the direction of rotation at the predetermined limits of rotation to effect panning movement thereof in both rotational directions.

6. The invention defined in claim 1 further including means for generating a signal to said control circuit means which is representative of a desired rotational speed for said mounting plate, said control circuit means being responsive to said desired speed signal for controlling the operation of said motor means to rotate said mounting plate at said desired speed.

7. A device for effecting panning movement of an article in two rotational directions within a predetermined limit of rotation comprising:
   a housing having a surface;
   a mounting plate adapted to be secured to the article;
   motor means for rotating said mounting plate in either of two rotational directions;
   a limit target slidably retained in a slot formed through said housing surface and movable relative thereto to selectively define the predetermined limit of rotation; and
   control circuit means responsive to the position of said limit target for controlling the operation of said motor means to change the direction of rotation at the predetermined limit of rotation to effect panning movement thereof.

8. The invention defined in claim 7 wherein said limit target is slidably retained in an arcuate slot formed through said housing surface to define the predetermined limit of rotation.

9. The invention defined in claim 7 wherein said control circuit means includes sensor means mounted on said mounting plate for generating a signal when said mounting plate is rotated to the predetermined limit of rotation defined by said limit target, said control circuit means being responsive to the generation of said signal for controlling the operation of said motor means to change the direction of rotation of said mounting plate.

10. The invention defined in claim 7 wherein two of said limit targets are slidably retained in an arcuate slot formed through said housing surface, each of said limit targets being movable to selectively and independently define individual predetermined limits of rotation.

11. The invention defined in claim 10 wherein said control circuit means is responsive to the position of each of said limit targets for controlling the operation of said motor means to change the direction of rotation at the predetermined limits of rotation to effect panning movement thereof in both rotational directions.

12. The invention defined in claim 7 further including means for generating a signal to said control circuit means which is representative of a desired rotational speed for said mounting plate, said control circuit means being responsive to said desired speed signal for controlling the operation of said motor means to rotate said mounting plate at said desired speed.

13. A device for effecting panning movement of an article in two rotational directions within a predetermined limit of rotation comprising:
   a mounting plate adapted to be secured to the article;
   motor means for rotating said mounting plate in either of two rotational directions;
   limit means including a digital encoder for generating an electrical signal defining a predetermined limit of rotation of said mounting plate;
   encoder means connected to said mounting plate for generating a signal which is representative of the actual amount of rotation thereof; and
   control circuit means responsive to said limit means and said encoder means for controlling the operation of said motor means to change the direction of rotation when the actual position of the mounting plate is equal to the predetermined limit of rotation to effect panning movement thereof.

14. The invention defined in claim 13 wherein said encoder means is a shaft encoder connected to a shaft extending between said motor means and said mounting plate for generating an electrical signal which is representative of the actual amount of rotation thereof.

15. The invention defined in claim 13 wherein said limit means defines two predetermined limits of rotation of said mounting plate.

16. The invention defined in claim 15 wherein said control circuit means is responsive to said limit means and said encoder means for controlling the operation of said motor means to change the direction of rotation when the actual position of the mounting plate is equal to the predetermined limit of rotation to effect panning movement thereof in both rotational directions.

17. The invention defined in claim 13 further including means for generating a signal to said control circuit means which is representative of a desired rotational speed for said mounting plate, said control circuit means being responsive to said desired speed signal for controlling the operation of said motor means to rotate said mounting plate at said desired speed.

18. A device for effecting panning movement of an article in two rotational directions within a predetermined limit of rotation comprising:
    a mounting plate adapted to be secured to the article;
    motor means for rotating said mounting plate in either of two rotational directions;
    limit means including a potentiometer for generating an electrical signal defining a predetermined limit of rotation of said mounting plate;
    encoder means connected to said mounting plate for generating a signal which is representative of the actual amount of rotation thereof; and
    control circuit means responsive to said limit means and said encoder means for controlling the operation of said motor means to change the direction of rotation when the actual position of the mounting plate is equal to the predetermined limit of rotation to effect panning movement thereof.

19. The invention defined in claim 18 wherein said encoder means is a shaft encoder connected to a shaft extending between said motor means and said mounting plate for generating an electrical signal which is representative of the actual amount of rotation thereof.

20. The invention defined in claim 18 wherein said limit means defines two predetermined limits of rotation of said mounting plate.

21. The invention defined in claim 20 wherein said control circuit means is responsive to said limit means and said encoder means for controlling the operation of said motor means to change the direction of rotation when the actual position of the mounting plate is equal to the predetermined limit of rotation to effect panning movement thereof in both rotational directions.

22. The invention defined in claim 18 further including means for generating a signal to said control circuit means which is representative of a desired rotational speed for said mounting plate, said control circuit means being responsive to said desired speed signal for controlling the operation of said motor means to rotate said mounting plate at said desired speed.

* * * * *